(No Model.) 2 Sheets—Sheet 1.
R. E. BOSCHERT.
PRESS.
No. 392,847. Patented Nov. 13, 1888.
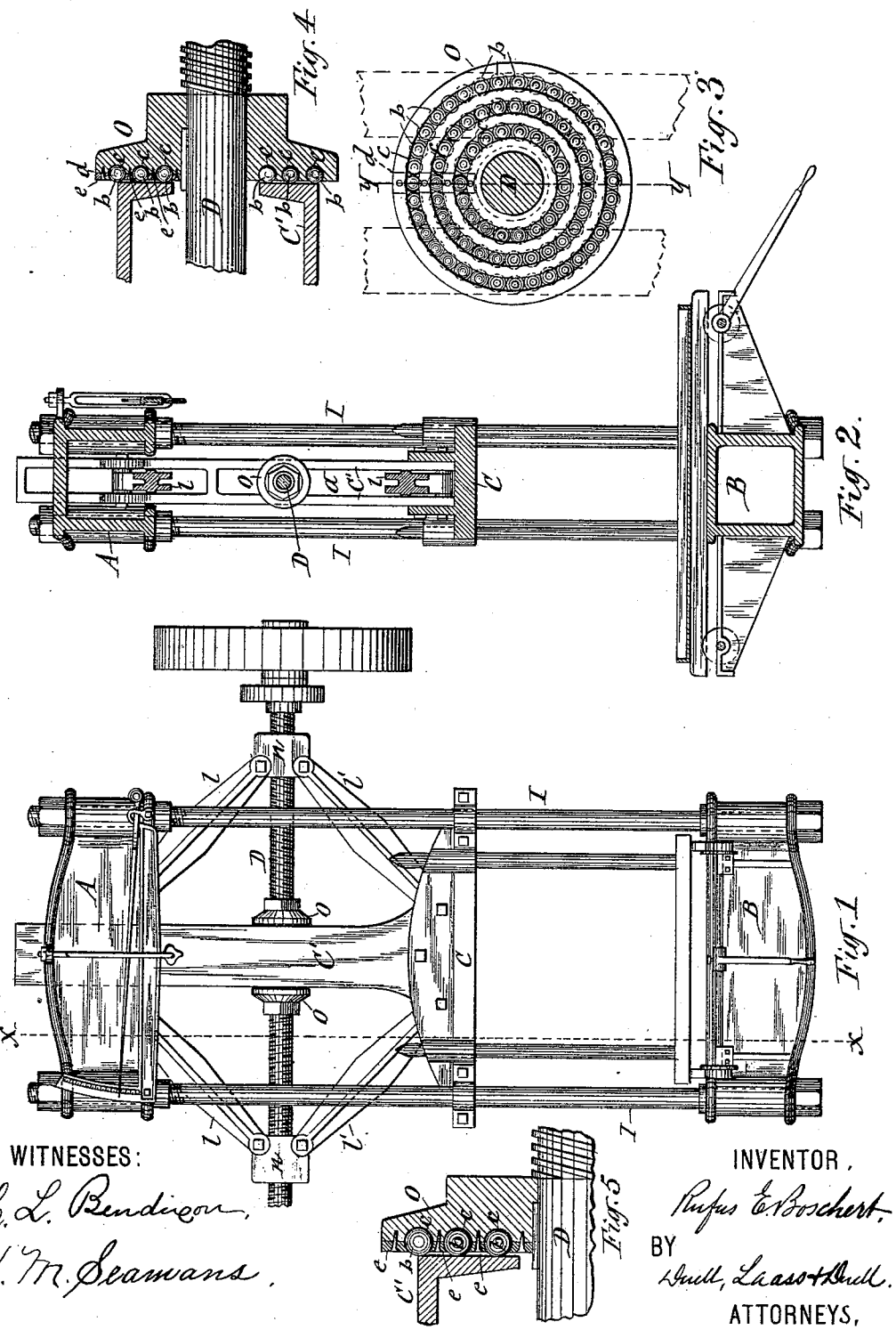
WITNESSES:
C. L. Bendixon
H. M. Seamans
INVENTOR,
Rufus E. Boschert,
BY
Duell, Laass & Duell.
ATTORNEYS.

(No Model.) 2 Sheets—Sheet 2.

R. E. BOSCHERT.
PRESS.

No. 392,847. Patented Nov. 13, 1888.

WITNESSES:
C. L. Bendicon,
H. M. Seamans.

INVENTOR.
Rufus E. Boschert.
BY
Dull, Laass & Dull,
ATTORNEYS.

UNITED STATES PATENT OFFICE.

RUFUS E. BOSCHERT, OF SYRACUSE, NEW YORK.

PRESS.

SPECIFICATION forming part of Letters Patent No. 392,847, dated November 13, 1888.

Application filed March 24, 1888. Serial No. 268,318. (No model.)

*To all whom it may concern:*

Be it known that I, RUFUS E. BOSCHERT, of Syracuse, in the county of Onondaga, in the State of New York, have invented new and useful Improvements in Presses, of which the following, taken in connection with the accompanying drawings, is a full, clear, and exact description.

This invention relates to the class of presses in which a right and left screw is extended through a longitudinally-slotted sliding standard carrying the follower of the press, and nuts on said screw at opposite sides of the sliding standard are connected with the press-head and follower by toggle-levers, and by means of collars rigidly attached to the screw and bearing against opposite sides of the sliding standard the screw is prevented from moving longitudinally. In the operation of such presses it is found that when they are subjected to severe strain the screw is crowded endwise with such force as to cause the collar, which has to resist said force, to bind on the sliding standard and greatly hinder the said collar from turning and sliding vertically on the standard, which sliding is due to the different speeds of vertical movement of the screw and standard.

The object of this invention is to obviate the aforesaid defect; and to that end the invention consists in providing the collars of the screw with concentric annular grooves in the faces of the collars adjacent to the sliding standard, placing loosely in each of said grooves a series of balls bearing on the side of the standard, and retaining the balls in the grooves by plates, which carry the balls across the slots of the standard and allow them to freely travel in the grooves. Said balls greatly relieve the collars from friction during the movements of the screw and sliding standard, and by the different speeds of movement of the latter two parts the balls are caused to continually change their tracks on the sides of the standard, and thus the danger of their wearing grooves in the said standard is obviated.

The invention is fully illustrated in the annexed drawings, in which—

Figure 7:
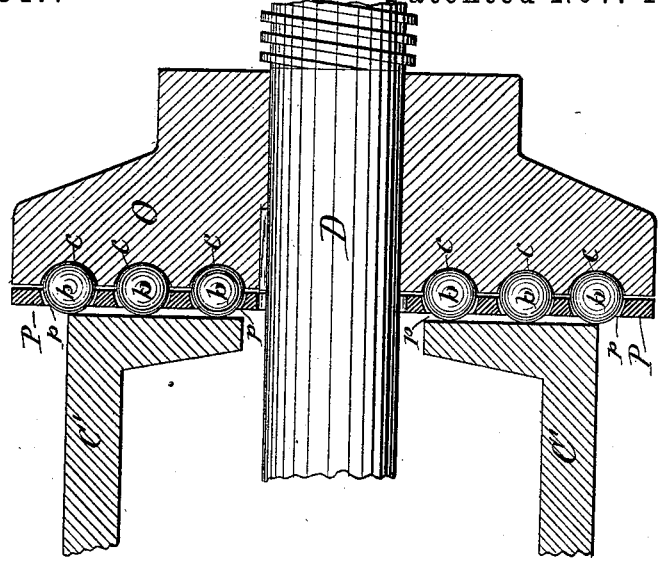
Figure 6:
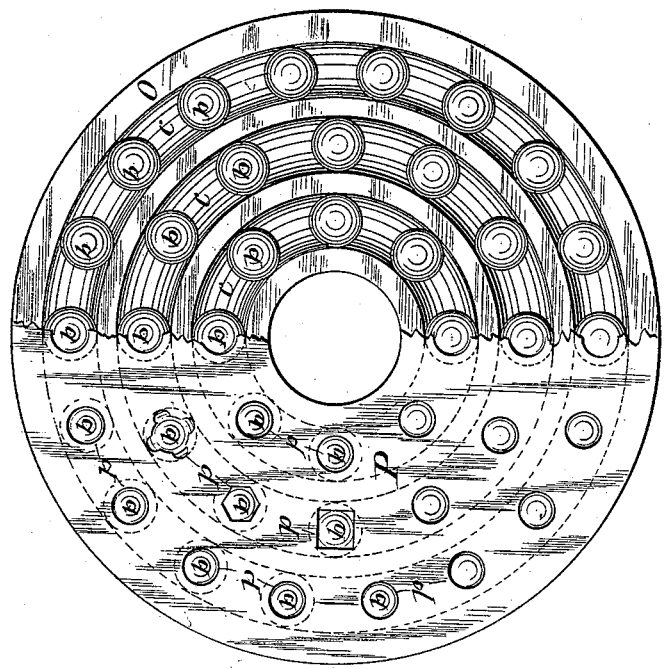

Figure 1 is a front elevation of a press embodying my improvements. Fig. 2 is a vertical transverse section on line $x\,x$, Fig. 1. Fig. 3 is an enlarged detached face view of one of the collars, showing the concentric annular grooves and a portion of the series of balls occupying the grooves. Fig. 4 is a transverse section on line $y\,y$, Fig. 3. Fig. 5 is a still further enlarged sectional view of the portion of the collar which is provided with the lateral channel for the introduction of the balls into the undercut annular grooves. Fig. 6 is a further enlarged face view of a modification of the means for retaining the balls in the annular grooves of the collar, and Fig. 7 is a transverse section of the same.

Similar letters of reference indicate corresponding parts.

A represents the head-block, and B the foot-block or bed, of the press, and I I are the rods which tie the aforesaid parts together.

C denotes the follower, which is connected to and guided by the standard C', sliding through a vertical passage in the head-block A. Said standard is provided with a vertical or longitudinal slot, $a$, through which is extended horizontally the right and left screw D.

$n\,n$ represent the nuts connected to the aforesaid screw, respectively, at opposite sides of the standard, and $l\,l$ and $l'\,l'$ are the upper and lower sets of toggle-levers, the upper set connecting the nuts $n\,n$ with the head-block A, and the lower set, $l'\,l'$, connecting the said nuts with the follower C. By rotating the screw D in one direction the follower C is forced down on the substance interposed between the follower and press-bed B, and a reverse movement raises the follower in the usual and well-known manner.

O O denote the collars secured to the screw D at opposite sides of the sliding standard C' for the purpose of preventing the screw from moving longitudinally toward either side of the standard. To relieve these collars from undue friction and obviate the danger of their becoming bound and cramped on the sides of the standard C', I provide each of said collars with an annular grooved face at the side adjacent to the standard, and preferably form said face directly on the collar by cutting or milling in the face of the collar the concentric annular grooves $c\,c\,c$, in each of which I place loosely a series of balls, $b\,b\,b$, which are allowed to freely travel in the grooves, and are retained therein preferably by under-cuts in the grooves, leaving overhanging longitudinal edges, which contract the widths of the grooves at the face of the collar, so as to prevent the balls from falling out of the grooves. A lateral or radial channel, d, is formed from the outer edge of the face of the collar to the inner annular groove, to allow the balls to be introduced through the lateral channel into the annular grooves. By means of plates e e e, detachably secured across the lateral channel d between the annular grooves c c and at the outside of the outer annular groove, the balls are retained in the annular grooves. However, I do not wish to limit myself specifically to the aforesaid means of retaining the balls in the grooves, inasmuch as the same result can be obtained by making the annular grooves of such depth as to allow at least one-half of the diameter of each ball to project at the face of the collar and placing loosely over the face of the collar a plate, P, of a thickness less than that of the portions of the balls which protrude at the face of the collar, said plate being provided with suitable perforations, p p p, which allow portions of the balls to protrude, and at the same time are of smaller diameters than the balls, and thus confine them in their respective grooves. The plate, being loose on the collar, allows the balls to freely travel in the grooves.

In the operation of the press the collars O O, turning with the screw, are relieved from friction on the sides of the standard by the interposition of the balls b b b, and inasmuch as the standard C' moves with greater speed than the vertical movement of the screw the aforesaid balls are caused to continually change their tracks on the sides of the standard, thus obviating the danger of wearing grooves in the latter. The balls are prevented from falling out of the grooves c c c during their movement across the vertical seat a of the standard either by the under-cut of the annular grooves and locking-plates e e or by the perforated plate P, hereinbefore described.

I do not claim, broadly, the arrangement of anti-friction balls between the bearings or adjacent faces of two working parts of a machine, as I am aware the same is not new. The chief novelty of my anti-friction device consists in the employment of the balls traveling in annular grooves in the rotary member of the machine and continuously changing their paths in the face of the other member of the machine, and also in the means for sustaining the balls in the grooves while crossing the slot in the standard.

Having described my invention, what I claim as new, and desire to secure by Letters Patent, is—

1. In combination with the sliding standard C', provided with the longitudinal slot a, press-screw D, extending through the said slot, and collars O O, connected to the screw at opposite sides of the sliding standard, and provided with annular grooved faces on the sides adjacent to the sliding standard, balls arranged loosely in the annular grooves and bearing on the sides of the sliding standard, and plates retaining the balls in the grooves, substantially as set forth.

2. The collar O, provided with undercut annular grooves c c and lateral induction-groove d, balls b b b, arranged loosely in said annular grooves, and the plates e e e, secured across the lateral groove between the annular grooves and at the outside of the outer annular groove, substantially as described and shown.

In testimony whereof I have hereunto signed my name, in the presence of two witnesses, at Syracuse, in the county of Onondaga, in the State of New York, this 20th day of March, 1888.

RUFUS E. BOSCHERT. [L. S.]

Witnesses:
 MARK W. DEWEY,
 ADAM F. WALZ.